(12) United States Patent
Naeli et al.

(10) Patent No.: US 10,967,646 B2
(45) Date of Patent: Apr. 6, 2021

(54) JETTABLE MATERIAL FIRING CHAMBER CHECK VALVE

(71) Applicant: HEWLETT-PACKARD DEVELOPMENT COMPANY, L.P., Houston, TX (US)

(72) Inventors: Kianoush Naeli, Corvallis, OR (US); James R. Przybyla, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,691

(22) PCT Filed: Jul. 14, 2015

(86) PCT No.: PCT/US2015/040372
§ 371 (c)(1),
(2) Date: Oct. 30, 2017

(87) PCT Pub. No.: WO2017/010994
PCT Pub. Date: Jan. 19, 2017

(65) Prior Publication Data
US 2018/0290459 A1    Oct. 11, 2018

(51) Int. Cl.
| B41J 2/175 | (2006.01) |
| B41J 2/14 | (2006.01) |
| B41J 2/055 | (2006.01) |
| F16K 15/00 | (2006.01) |

(52) U.S. Cl.
CPC ......... *B41J 2/17596* (2013.01); *B41J 2/055* (2013.01); *B41J 2/1404* (2013.01); *B41J 2/1433* (2013.01); *B41J 2/14145* (2013.01); *B41J 2/14209* (2013.01); *F16K 15/00* (2013.01)

(58) Field of Classification Search
None
See application file for complete search history.

(56) References Cited

U.S. PATENT DOCUMENTS

| 4,286,664 A | 9/1981 | Bolding |
| 5,053,787 A * | 10/1991 | Terasawa ............... B41J 2/1652 347/22 |
| 5,358,374 A | 10/1994 | Correia et al. |
| 5,751,317 A | 5/1998 | Peeters et al. |
| 5,872,582 A | 2/1999 | Pan |

(Continued)

FOREIGN PATENT DOCUMENTS

| CN | 103282209 | 9/2013 |
| CN | 107206790 | 9/2017 |

(Continued)

OTHER PUBLICATIONS http://epubl.ltu.se/1402-1617/2005/220/LTU-EX-05220-SE.pdf Author: Forsman, C. et al. Issue date: Jan. 21, 2005.

*Primary Examiner* — Alejandro Valencia
(74) *Attorney, Agent, or Firm* — Trop, Pruner & Hu, P.C.

(57) ABSTRACT

A check valve for preventing reverse flow of jettable material within a jettable material firing chamber during a firing event includes a free-floating plug. The check valve further includes at least one holding post, wherein the free-floating plug is arranged between at least one wall of the firing chamber and the holding posts, the at least one wall and the holding posts restricting the movement of the free-floating plug within the chamber.

14 Claims, 12 Drawing Sheets

(56) References Cited

U.S. PATENT DOCUMENTS

| | | |
|---|---|---|
| 5,880,752 A | 3/1999 | Weber et al. |
| 6,241,350 B1 | 6/2001 | Otsuka et al. |
| 6,386,682 B1 | 5/2002 | Kimura |
| 7,387,376 B2 * | 6/2008 | Murakami ........... B41J 2/17596 347/84 |
| 7,494,208 B2 | 2/2009 | Kwon |
| 7,703,898 B2 * | 4/2010 | Klein Meuleman .................. B41J 2/17596 347/85 |
| 7,802,874 B2 | 9/2010 | Wee |
| 8,047,640 B2 | 11/2011 | Uchiyama |
| 8,701,662 B2 | 4/2014 | Pujol |
| 2004/0017444 A1 | 1/2004 | Gunther |
| 2006/0197812 A1 | 9/2006 | Murakami et al. |
| 2007/0206075 A1 | 9/2007 | Bulman et al. |
| 2007/0222828 A1 | 9/2007 | Stathem et al. |
| 2007/0229609 A1 | 10/2007 | Kim |
| 2010/0201759 A1 * | 8/2010 | Kawase ............... B41J 2/16532 347/85 |
| 2013/0271537 A1 | 10/2013 | Boyd et al. |
| 2016/0200116 A1 | 7/2016 | Boyd et al. |

FOREIGN PATENT DOCUMENTS

| | | |
|---|---|---|
| EP | 0412643 | 2/1991 |
| EP | 0436047 A1 | 7/1991 |
| EP | 0591989 B1 | 1/2000 |
| EP | 0802055 B1 | 10/2001 |
| EP | 0816088 B1 | 4/2002 |
| EP | 0970350 | 6/2005 |
| WO | WO-2016175746 A1 | 11/2016 |

\* cited by examiner

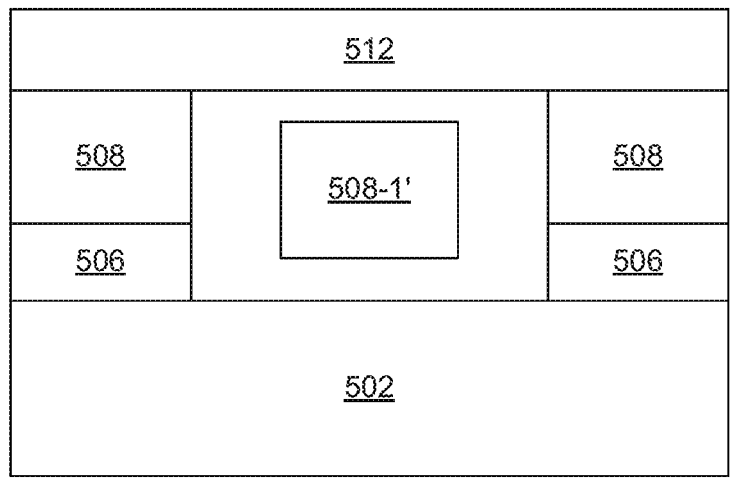
*Fig. 5F*
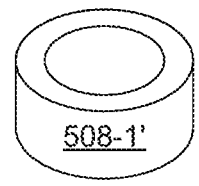
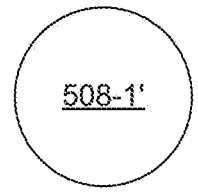
*Fig. 5H*   *Fig. 5G*

JETTABLE MATERIAL FIRING CHAMBER CHECK VALVE

BACKGROUND

Printers are used to form images on media by controlled ejection of ink from a printhead. The printhead includes a number of firing chambers with a nozzle defined in each firing chamber. Ink present within a firing chamber of the printhead may be ejected through the nozzle and onto the media to form the image. Ejection of ink is facilitated through a firing event wherein the excitation of a number of firing devices located within the firing chamber ejects the jettable material through the nozzle.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIGS. 5A through 5F are cut-away side views of the jettable material firing chamber of FIG. 1 during various stages of manufacture, according to one example of the principles described herein.

FIGS. 5H and 5G are a perspective and top views, respectively, of a plug that is disposed within the jettable material firing chamber of FIG. 1, according to one example of the principles described herein.

Throughout the drawings, identical reference numbers designate similar, but not necessarily identical, elements.

DETAILED DESCRIPTION

Figure 1:
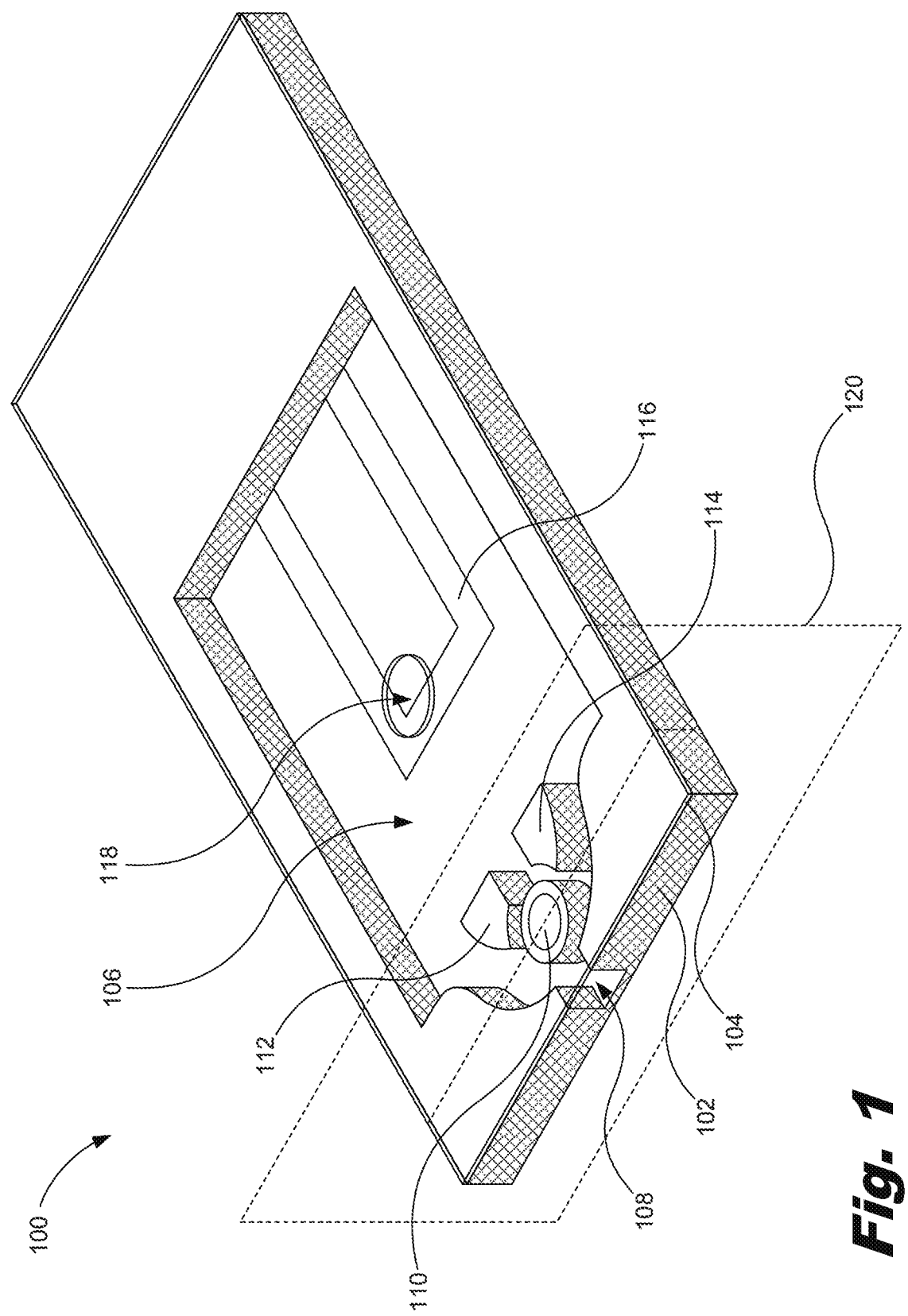
FIG. 1 is a perspective view of a jettable material firing chamber, according to one example of the principles described herein.

In some printhead firing chambers, a firing event may cause a significant amount of jettable material such as ink to escape back through an inlet through which the jettable material enters the firing chamber. When the ink escapes back through the inlet during the firing event, this results in a relatively lower amount of jettable material to be ejected through the nozzles and onto the media than existed in the firing chamber shortly before and during the firing event. This backflow of jettable material results in a lower volume of ejected material which, in turn, results in a lower quality printed media than could otherwise be obtained if the entirety of the jettable material extant in the chamber were to be ejected.

Further, in some printhead firing chambers, the backflow of jettable material through the inlet may cause printhead manufactures to manufacture relatively larger firing chambers to compensate for the lost jettable material due to the backflow. However, this causes the footprint of the printhead within the printing device to be larger, and increases manufacturing costs due to the use of more materials.

Still further, in some printhead firing chambers, the backflow of jettable material through the inlet may cause the refill of jettable material after the firing event to take a longer time than may be possible if all the jettable material within the firing chamber were to be ejected through the nozzles instead of being allowed to escape through the inlet. This is because the flow of jettable material into the firing chamber after the firing event is hindered by the backflow of the jettable material through the inlet and because relatively less suction or negative pressure exists within the firing chamber. In some instances, the inlet fluid resistance may be increased by making the orifice of the inlet smaller. However, this decreases the speed of the refill process after the firing event and, in turn, reduces the firing speed of the nozzles and printing speed of the printing device.

Still further, in the examples described herein, the check-valve included within the firing chamber prevents cross-talk between neighboring firing chambers. The check valve reduces the amount of energy that is undesirably transferred from a nozzle and chamber that is fired to the neighboring firing chambers that have not been fired, and, in turn, reduces the chance of unintended fluid ejection from the neighboring nozzles within the neighboring firing chambers.

Examples described herein provide a check valve for preventing reverse flow of jettable material within a jettable material firing chamber during a firing event. The check valve includes a free-floating plug and at least one holding post. The free-floating plug is arranged between at least one wall of the firing chamber where the inlet is located and the holding posts. The at least one wall and the holding posts restrict the movement of the free-floating plug within the firing chamber.

The free-floating plug is disposed within the firing chamber upstream from a number of jettable material firing devices disposed within the firing chamber and downstream from an inlet through which jettable material enters the firing chamber. During the firing event, a number of actuators disposed within the chamber create a relatively higher pressure within the chamber compared to pressure within the chamber before the firing event to force the free-floating plug to block the inlet and eject the jettable material from the nozzle aperture.

After the jettable material firing event, the firing devices create a lower pressure within the chamber compared to pressure within the chamber during the firing event. This lower, negative pressure forces the free-floating plug to unblock the inlet and refill the chamber with jettable material via the inlet. Before the jettable material firing event, the position of the free-floating plug within the firing chamber is overcome by capillary forces to allow the jettable fluid to enter the chamber.

Examples described herein provide a larger volume of jettable material to be jetted out of the nozzle for a firing chamber with a given chamber size and thermal budget, without significantly effecting the refill speed and the printing speed. By using a free-floating plug within a check valve, the amount of backflow may be effectively reduced without compromising the firing speed of the nozzle, without increasing the amount of the print die footprint, and without increasing manufacturing complexity.

As used in the present specification and in the appended claims, the term "check valve" is meant to be understood broadly as a valve constructed to prevent reversed fluid flow. A check valve is sometimes referred to as a non-return valve (NRV). The check valves described herein provide shut off against reverse flow of jettable material out of the firing chamber via the inlet.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a perspective view of a jettable material firing chamber (100), according to one example of the principles described herein. The firing chamber (100) may be implemented in a printing device that ejects a jettable material through a nozzle. The jettable material ejected from the firing chamber (100) may be any material that may be ejected through a nozzle such as, for example, inks, pharmaceuticals, biomedical fluids such as blood or urine, mechanical suspensions, colloidal suspensions, and gases, among other materials capable of being ejected out of the nozzles. Examples of printing devices that may utilize the examples described herein include thermal inkjet printers, piezoelectric inkjet printers, inkjet printers that use shape memory alloys, and inkjet printers that use supersonic motors, among others.

The jettable material firing chamber (100) includes a first layer (102) and a second layer (104). In one example, the second layer (104) may be referred to as a top-hat layer (104). Materials used within the first layer (102) and a second layer (104), and the manner in which the jettable material firing chamber (100) is manufactured will be described in more detail in connection with FIGS. 5A through 5G and the cross-section plane (120) depicted in FIG. 1. The second layer (104) is depicted throughout FIGS. 1 through 4B as transparent so that details within the firing chamber (100) may be depicted.

A chamber recess (106) and an inlet (108) are defined within the first layer (102). The chamber recess (106) forms the portion of the firing chamber (100) into which ink or other jettable material is introduced in order to eject the jettable material from the firing chamber (100).

A nozzle aperture (118) is defined within the second layer (104) in order to permit jettable material to be ejected out of the firing chamber (100) during a firing event. The firing event is created through excitation of an actuator (116) disposed within the chamber recess (106) of the firing chamber (100). The actuator (116) may be any type of actuator that may eject jettable material from the firing chamber (100) via the nozzle aperture (118). In one example, the actuator (116) may include, for example, a heating element used in thermal inkjet printheads wherein the heating element generates bubbles within the jettable material by heating up and ejecting the jettable material by utilizing the expansion of the bubbles. In another example, the actuator (116) may include, for example, a piezoelectric actuator that changes the shape of a piezoelectric material when an electric field is applied. In still another example, the actuator (116) may include, for example, a shape memory alloy that is actuated electrically, wherein an electric current results in Joule heating and deactivation occurs by convective heat transfer to the ambient environment.

The jettable material firing chamber (100) further includes a check valve including elements 110, 112, and 114 as they interact with elements within the firing chamber (100). Element 110 is a free-floating plug. Elements 112 and 114 are holding posts that restrict the movement of the free-floating plug (110) into portions of the chamber recess (106) that contain the actuator (116) and the nozzle aperture (118). The free-floating plug (110) is allowed to freely move between the portion of the chamber recess (106) at which the inlet (108) is defined in the first layer (102) and the holding posts (112, 114).

The free-floating nature of the plug (110) means that the plug (110) is not attached to a spring, anchor, or other device that moves the plug (110) in a certain direction or returns the plug (110) to a certain position. This provides for a firing chamber (100) that consumes less real-estate on a printhead die, provides a smaller foot-print than may be necessary with additional elements attached to the plug (110), and reduces manufacturing complexity. The ability to retain a relatively smaller printhead die footprint also assists in increasing or retaining a high-density inkjet architecture. Also, the fabrication process associate with the manufacture of the firing chamber (100) including the present check-valve system is simple and fully compatible with the standard inkjet manufacturing processes. This reduces the cost in manufacturing significantly while realizing an added benefit of increased inkjet drop volume or drop weight without sacrificing printing speed or increasing power consumption or power requirements to activate the actuator (116) in a manner that causes the actuator (116) to compensate for a backflow of jettable material.

The free-floating plug (110) is depicted throughout FIGS. 1 through 5G as having a cylindrical shape. However, the plug (110) may have any three-dimensional shape sufficient to create a relatively higher effective fluid resistance at the inlet (108) and reduce or eliminate backflow of jettable material through the inlet (108). In some examples, the plug (110) may have any quadratic shape including, for example, an ellipsoidal shape, spheroidal shape, a cone shape, a cylindrical shape, a torus shape, other closed three-dimensional shapes, or combinations thereof.

In one example, the plug (110) may have diameter, or the smallest width of the shape of the plug (110) may be longer than the internal height of the firing chamber (100). This configuration precludes the plug from turning on an edge inside the firing chamber (100). If the plug (110) were allowed to turn on an edge, the plug (110) may not be able to effectively obstruct the inlet (108).

In another example, the smallest width of the shape of the plug (110) may be longer than any passage into the chamber recess (106) of the firing chamber (100) including the inlet (108) and passages between the holding posts (112, 114) and edge of the firing chamber (100) in which the inlet (108) is defined. This restricts the movement of the plug (110) into areas of the firing chamber (100) other than those defined by the holding posts (112, 114) and edge of the firing chamber (100) in which the inlet (108) is defined. In one example, the holding posts (112, 114) extend partially between the floor of the firing chamber (106) and the second layer (104). In this example, the holding posts (112, 114) are coupled to or formed from both the floor of the firing chamber (106) and the second layer (104), or, in this example, are attached to or formed from either the floor of the firing chamber (106) or the second layer (104). In an example where the holding posts (112, 114) are attached to or formed from either the floor of the firing chamber (106) or the second layer (104), the holding posts (112, 114) are extended sufficiently far enough to restrict the movement of the plug (110) into areas of the firing chamber (100) other than those defined by the holding posts (112, 114) and edge of the firing chamber (100) in which the inlet (108) is defined.

Figure 2A:
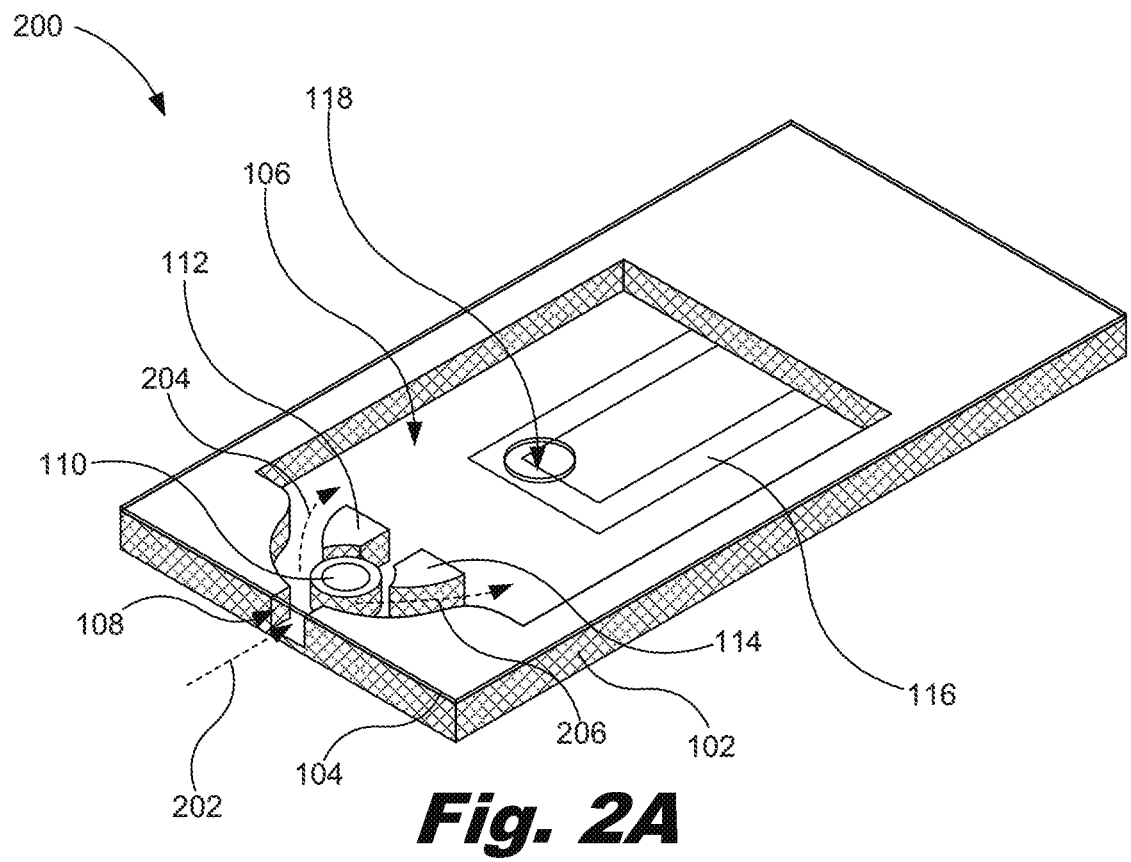
FIGS. 2A and 2B are a perspective view and a top view, respectively, of the jettable material firing chamber of FIG. 1 before or between a jettable material ejection event or during an idle time of an actuator, according to one example of the principles described herein.
Figure 2B:
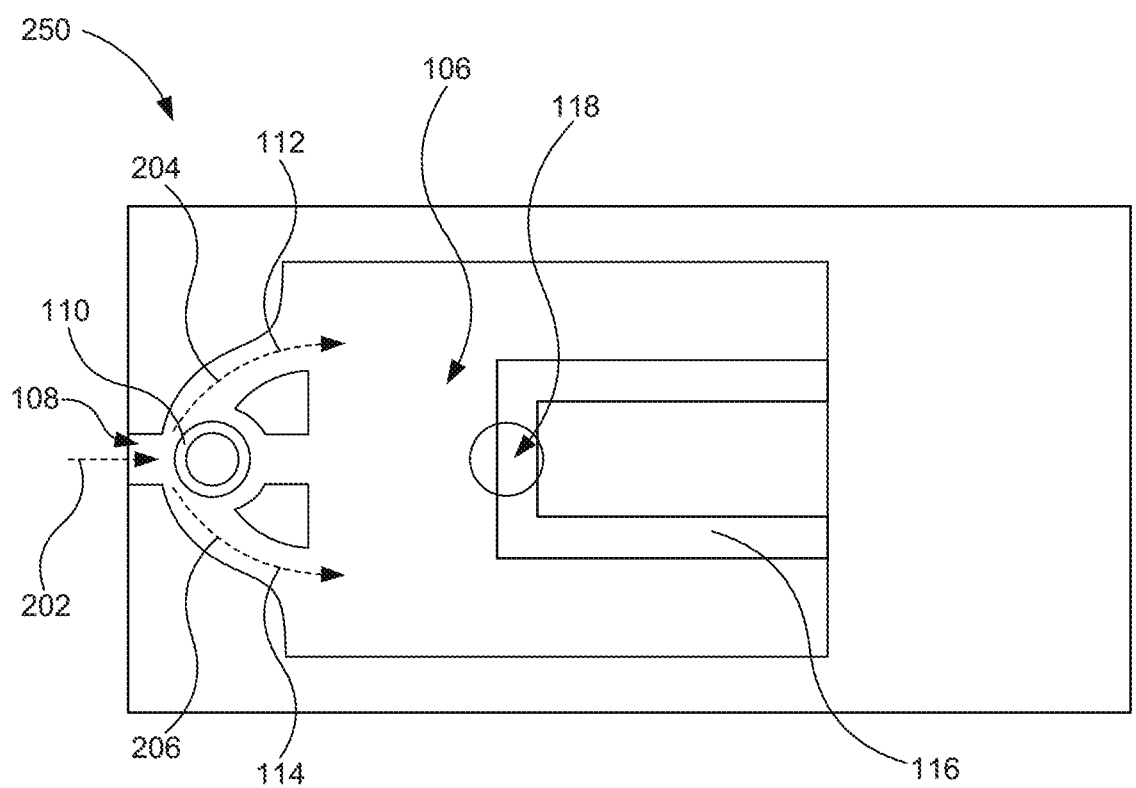

The function of the check valve (110, 112, 114) within the firing chamber (100) will now be described in connection with FIGS. 2A through 4B. FIGS. 2A and 2B are a perspective view (200) and a top view (250), respectively, of the jettable material firing chamber (100) of FIG. 1 before or between a jettable material ejection event or during an idle time of the actuator (116), according to one example of the principles described herein. Dashed arrows 202, 204, and 206 indicate the flow of jettable material such as ink into the firing chamber (100). The jettable material enters the firing chamber (100) via the inlet (108), and flows past the plug (110), between the holding posts (112, 114) and into the main portion of the firing chamber (100) where the actuator (116) and nozzle aperture (118) are located.

Figure 6:
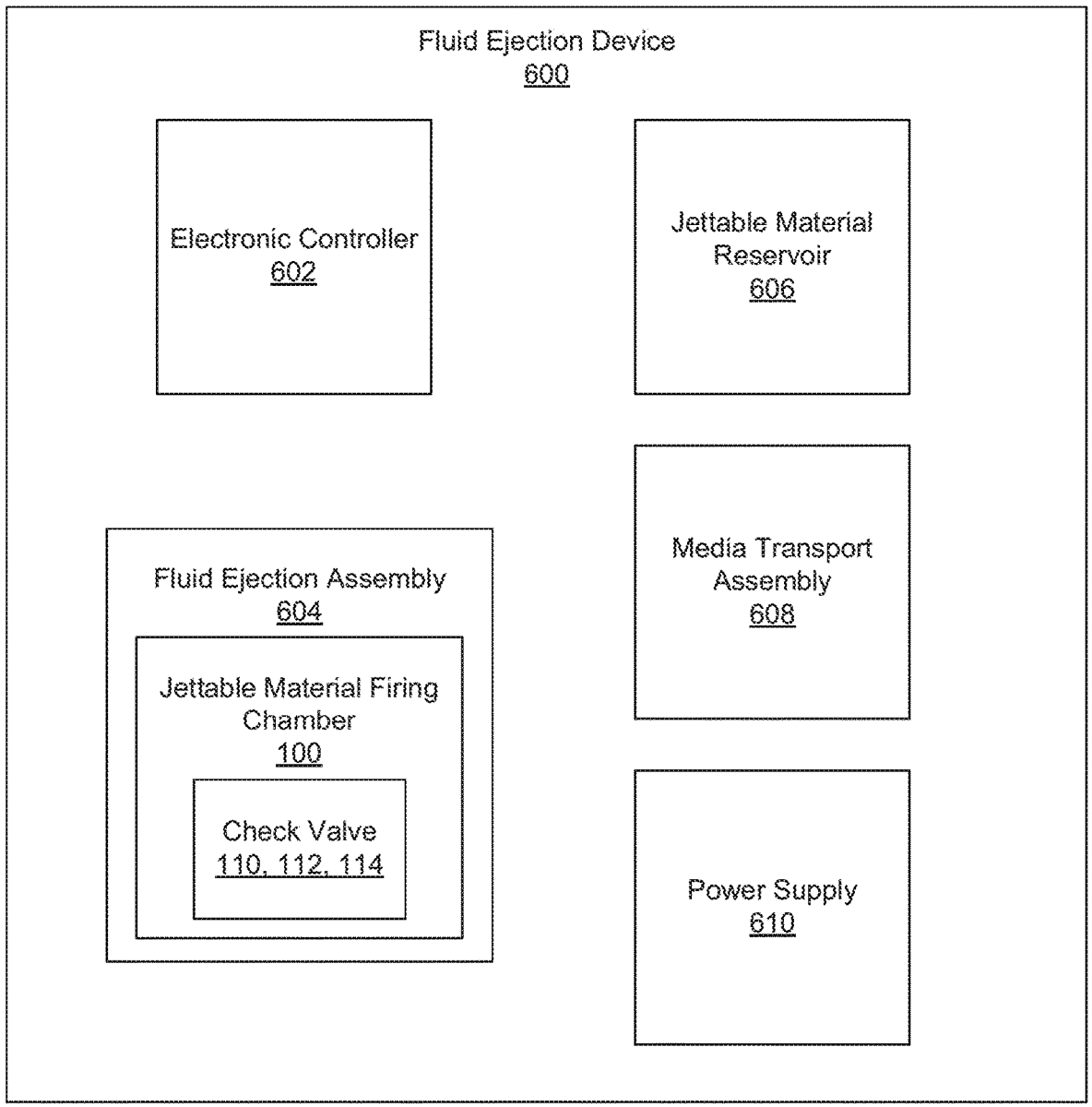
FIG. 6 is a block diagram of a fluid ejection device including the jettable material firing chamber of FIG. 1, according to one example of the principles described herein.
Figure 7:
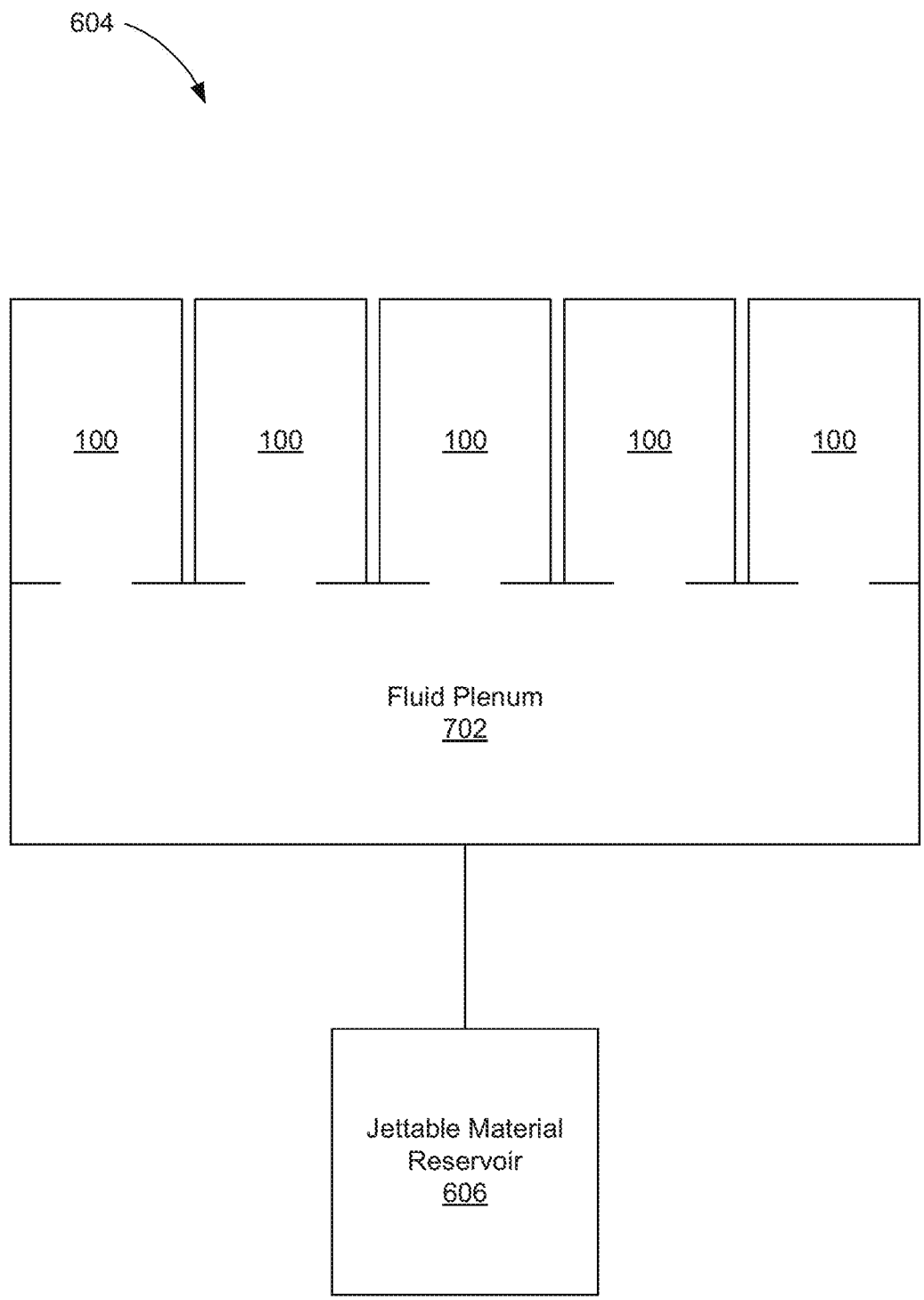
FIG. 7 is a block diagram of a fluid ejection assembly of FIG. 6 incorporating a fluid plenum, according to one example of the principles described herein.

The flow of jettable material in this instance is performed via capillary forces that draw the ink into the firing chamber (100). In one example, this capillary filling of the firing chamber (100) may occur before start-up of the printing device in which the firing chamber (100) is embodied. In the phase of operation depicted in FIGS. 2A and 2B, the fluid resistance of the opening of the inlet (108) is not important since a sufficient amount of time is provided during deactivation of the actuator (116) for the jettable material to fill the firing chamber (100). The jettable material flows to the firing chamber (100) from a fluidically-coupled jettable material reservoir (FIG. 6, 606) that provides the jettable material to the firing chamber (100) via the inlet (108). In one example, the fluidically-coupled jettable material reservoir (FIG. 6, 606) may include a fluid plenum (FIG. 7, 702). In this example, pressure within the fluid plenum (702) fluidically coupled between the firing chamber (100) and the fluidically-coupled jettable material reservoir (FIG. 6, 606) resists variance during a jettable material firing event and may be used to refill firing chamber (100) within a fluid ejection assembly. Thus, with the use of an fluid plenum (702), the pressure difference between the firing chamber (100) and the fluid plenum (702) causes the plug (110) to move.

Figure 3A:
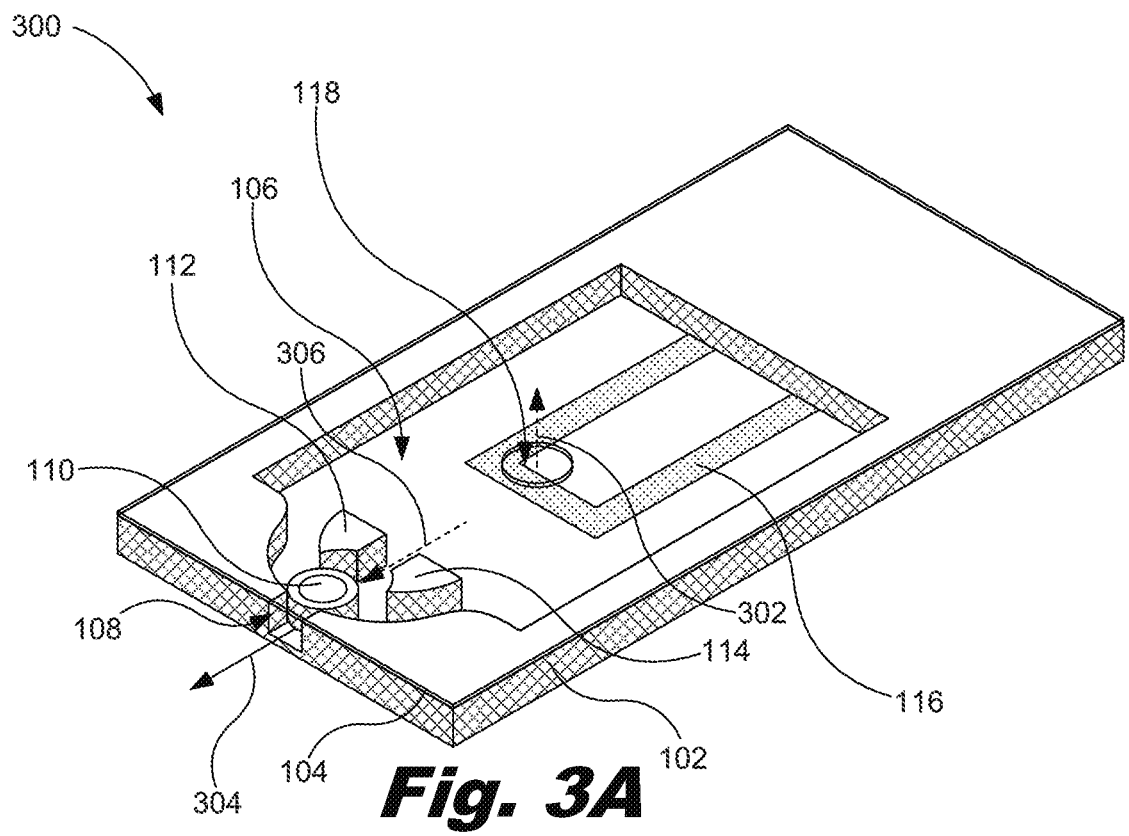
FIGS. 3A and 3B are a perspective view and a top view, respectively, of the jettable material firing chamber of FIG. 1 during a jettable material ejection event, according to one example of the principles described herein.
Figure 3B:
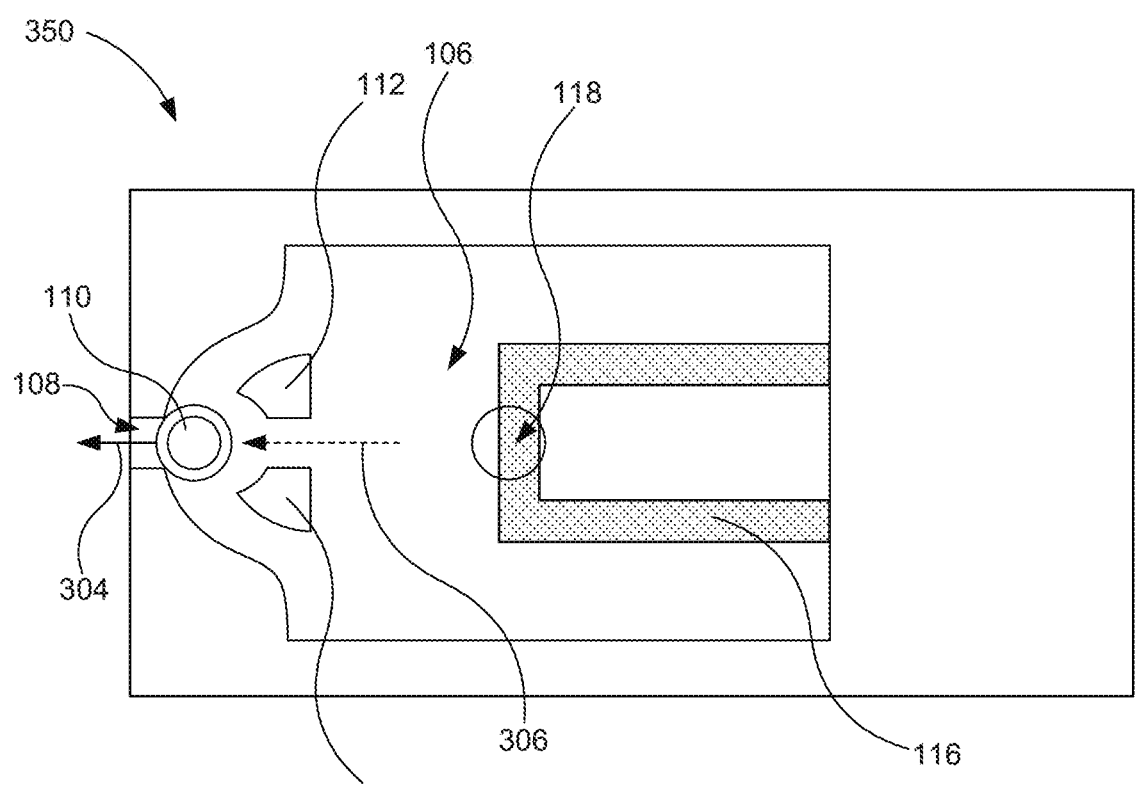

FIGS. 3A and 3B are a perspective view (300) and a top view (350), respectively, of the jettable material firing chamber (100) of FIG. 1 during a jettable material ejection event, according to one example of the principles described herein. The excitation of the actuator (116) within the firing chamber (100), as indicated by the shading of the actuator (116), produces a relatively higher pressure within the firing chamber (100). This relatively higher pressure causes an amount of jettable material to be ejected from the firing chamber (100) through the nozzle aperture (118) as depicted in connection with the dashed arrow 302 associated with the nozzle aperture (118). For example, in a thermal inkjet printhead that utilizes a heating element, jettable material is filled in the firing chamber (100). A current is applied to the heating element to heat the jettable material, thereby generating a bubble in the jettable material for ejecting the jettable material out of the firing chamber (100) through the nozzle aperture (118) by the expansion of the bubble. Similar increases in pressure occur in printing devices that utilize piezoelectric actuators, shape memory alloy actuators, and supersonic motor actuators, among others.

The activation of the actuator (116) and related increase in pressure within the firing chamber (100) forces the jettable material away from the actuator (116). In this situation, and without the plug (110), a portion of the jettable material may backflow out of the firing chamber (100) through the inlet (108), and into the fluidically-coupled jettable material reservoir (FIG. 6, 606). However, examples described herein provide the plug (110) of the check valve.

Thus, throughout the examples described herein, the increase in pressure within the firing chamber (100) forces the jettable material and the plug (110) towards the inlet (108). Movement of the plug (110) is indicated by arrow 304, while the dashed arrow 306 associated with the plug (110) indicates the force provided by the increase in pressure within the firing chamber (100) and the general flow of jettable material away from the actuator (116). The plug (110) stops the backflow of jettable material as it blocks the inlet (108) due to the flow of jettable material in the direction indicated by dashed arrow 306. In this manner, the effective fluid resistance of the inlet increases significantly, which effectively leaves the nozzle aperture (118) as the only path for expulsion of the jettable material. This ensures that a larger drop of jettable material is ejected from the firing chamber (100) since a greater amount of the jettable material is retained within the firing chamber (100). This larger drop of jettable material is achieved using the same chamber volume and thermal budget relative to the utilization of a firing chamber (100) that does not include the present plug (110).

Figure 4A:
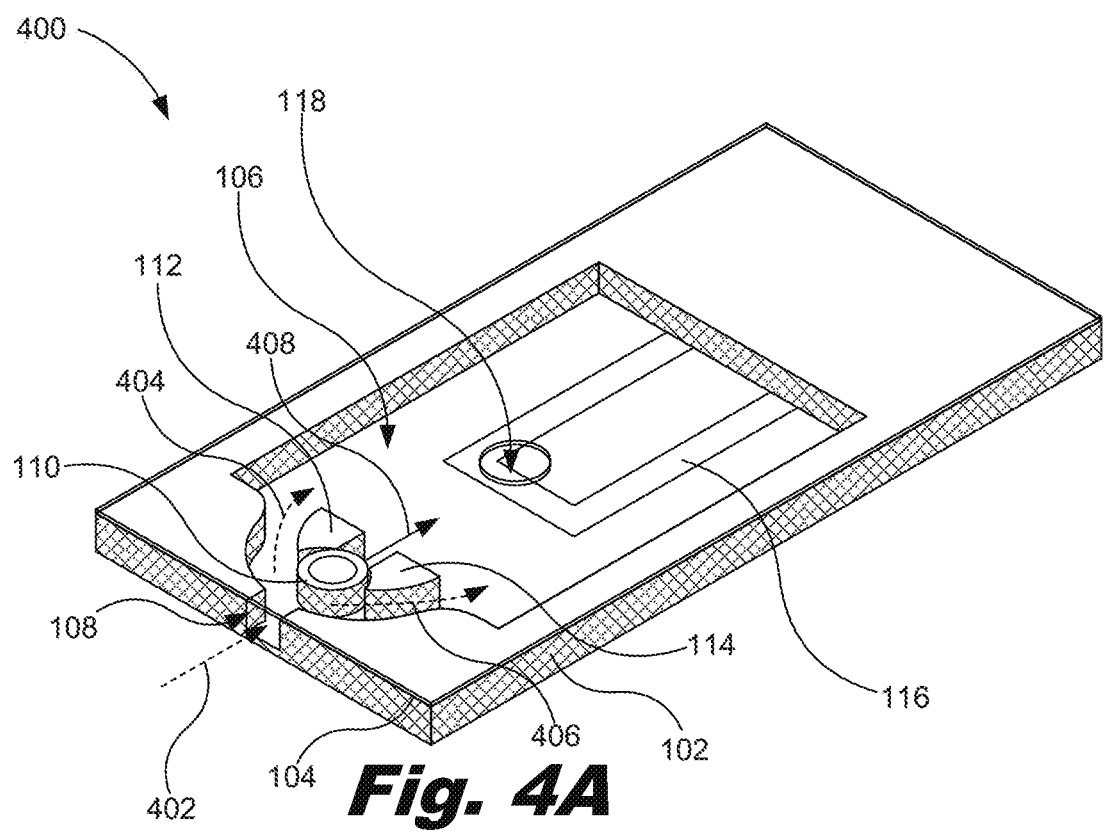
FIGS. 4A and 4B are a perspective view and a top view, respectively, of the jettable material firing chamber of FIG. 1 after a jettable material ejection event, according to one example of the principles described herein.
Figure 4B:
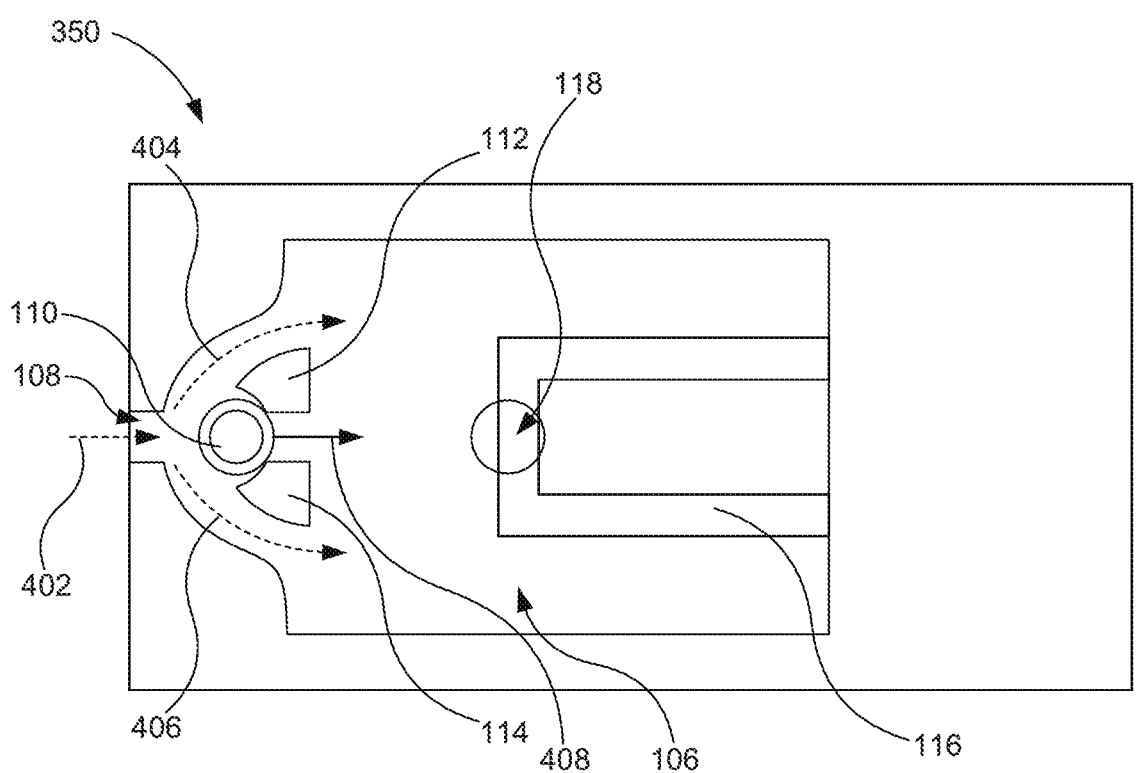

FIGS. 4A and 4B are a perspective view (400) and a top view (350), respectively, of the jettable material firing chamber (100) of FIG. 1 after a jettable material ejection event, according to one example of the principles described herein. After a firing event, jettable material is to be replenished within the firing chamber (100) in preparation for a subsequent firing event. Thus, the jettable material is supplied again to the firing chamber (100) via the inlet (108).

As depicted in FIGS. 4A and 4B, during a refill of the firing chamber (100) beginning shortly after ejection of jettable material during the firing event, a negative pressure may exist within the firing chamber (100) caused by the lack of jettable material or other fluids or gases within the firing chamber (100), This negative pressure is a lower pressure relative to the increased pressure existent during the firing event as described in connection with FIGS. 3A and 3B, and lower pressure relative to before or between a jettable material ejection event or during an idle time of an actuator as described above in connection with FIGS. 2A and 2B. This negative pressure causes jettable material to be drawn into the chamber recess (106) of the firing chamber (100) from the fluidically-coupled jettable material reservoir (FIG. 6, 606) as indicated by dashed arrow 402.

This suction of jettable material into the firing chamber (100) applies an inward force to the plug (110), and causes the plug (110) to move to the position as depicted in FIGS. 4A and 4B relative to the position of the plug (110) as depicted in FIGS. 3A and 3B. This movement of the plug (110) is depicted using arrow 408. Due to the inward force on the plug (110) of the jettable material refilling the firing chamber (100), the plug (110) is forced to interface with the holding posts (112, 114) and preclude flow of jettable material between the holding posts (112, 114). In this manner, fluid resistance with respect to the inlet (108) is reduced to a minimum level, and jettable material flows into the chamber recess (106) of the firing chamber (100) fast enough to provide another volume of jettable material to be ejected from the nozzle aperture (118) in a subsequent firing event.

In one example, the jettable material flows in the direction of dashed arrows 404 and 406 around the plug (110) and holding posts (112, 114) and into the chamber recess (106) of the firing chamber (100). However, in another example, the flow of jettable material into the firing chamber (100) may be different due to different arrangements of a number of the holding posts (112, 114). The arrangement of the holding posts (112, 114) in FIGS. 1 through 4B is an example of such an arrangement, but other arrangements may be used as long as such arrangements confine the plug (110) within a defined area surrounding the inlet (110). Despite what arrangement is used, the arrangements provide for the free-floating plug (110) to seal or close the inlet (108) during a firing event and freely unseal or unblock the inlet (108) during a refill of the firing chamber (100).

In one example, the size of the inlet (108) may be fabricated to be larger or smaller than that depicted in FIGS. 1 through 4B to provide for different refill frequencies and refill times. However, the smallest width of the shape of the plug (110) may be longer than the width of the opening of the inlet (108) in order to ensure that the plug (110) does not exit the firing chamber (100) through the inlet (108).

The refill frequencies of the firing chamber (100) may be defined as the number of times within a time period the firing chamber (100) is able to be refilled based on the size of the inlet (108) and the functioning of the check valve (110, 112, 114). Because the plug (110) is free-floating within the firing chamber (100), the check valve (110, 112, 114) does not contribute to a decrease in the refill frequency of the firing chamber (100).

In another example, the thickness of the plug (110) and the distance between the plug (110) and the inlet (108) during the refill of the firing chamber (100) when the plug (110) is retracted away from the inlet (108) also affects the frequency of the refill and the refill time. These factors may cause the jettable fluid to be more or less obstructed as it enters the firing chamber (100). Thus, the size of the inlet (108), the thickness of the plug (110), and the distance between the plug (110) and the inlet (108), among other aspects of the firing chamber (100) may be tuned to achieve a desired fill volume, refill frequency, and refill time.

The fabrication or manufacturing processes of the firing chamber (100) will now be described in connection with FIGS. 5A through 5G. FIGS. 5A through 5F are cut-away side views of the jettable material firing chamber (100) of FIG. 1 during various stages of manufacture, according to one example of the principles described herein. The description of FIGS. 5A through 5G will be presented in connection with the cross-section plane (120) depicted in FIG. 1. The cross-section plane (120) depicted in FIG. 1 is used as the basis for the cut-away side views of the jettable material firing chamber (100) of FIGS. 5A through 5F.

The fabrication process may begin by patterning a first layer of sacrificial material (504) on a substrate (502). In one example, the substrate (502) is a silicon wafer such as those used in manufacturing thermal inkjet nozzles. The first layer of sacrificial material (504) may be deposited on the substrate (502) using, for example, a liquid dispense or chemical vapor disposition (CVD) process. Although not depicted, a number of actuators such as the actuator (116) of FIGS. 1 through 4B, resistors, complementary metal-oxide-semiconductor (CMOS) circuitry, or other electrical elements may be embedded within the substrate (502) to provide functionality of the firing chamber (100) as described herein.

In one example, the first sacrificial material (504) may be a polymer such as a photoresist, metal, amorphous silicon (a-Si), polycrystalline silicon (poly-Si), or a dielectric layer such as silicon dioxide. The first sacrificial material (504) may be deposited on the substrate (502) using, for example, chemical vapor deposition (CVD) processes.

A primer layer (FIG. 5B, 506) may be deposited on the substrate (502). The primer layer (506) forms a portion of the firing chamber (100). Thus, the primer layer (506) is patterned on the surface of the substrate (502) in a manner that forms the firing chamber (100). In another example, the primer layer (506) may be applied to the substrate (502) before the first sacrificial layer (504) is applied, or approximately simultaneously. The other portions of the walls of the firing chamber (100) may be built over the primer layer (506). Also, for reasons described in more detail below, the thickness of the primer layer (506) may be larger than the first sacrificial layer (504). In one example, the primer layer (506) may be made of SU-8 epoxy-based negative photoresist that is cross linkable via exposure to ultraviolet (UV) radiation. In this example, the primer layer (506) is exposed to UV light in order to cross-link the SU-8 material of the primer layer (506) to form the structure depicted in FIG. 5B.

Figure 5A:
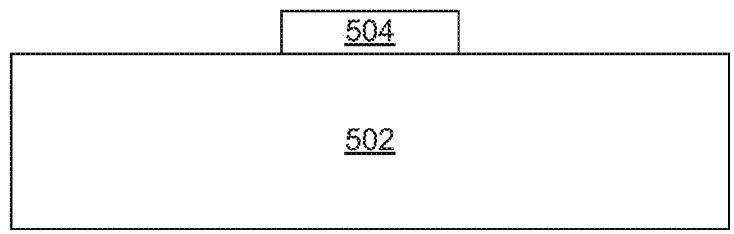
Figure 5B:
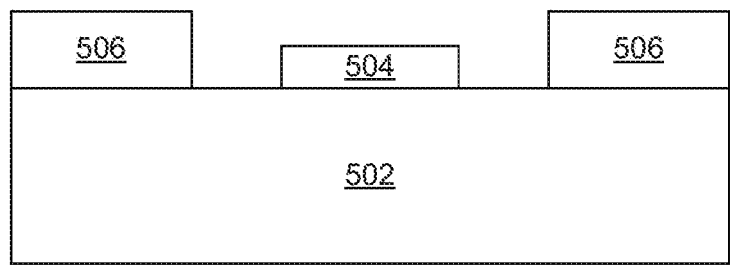
Figure 5C:
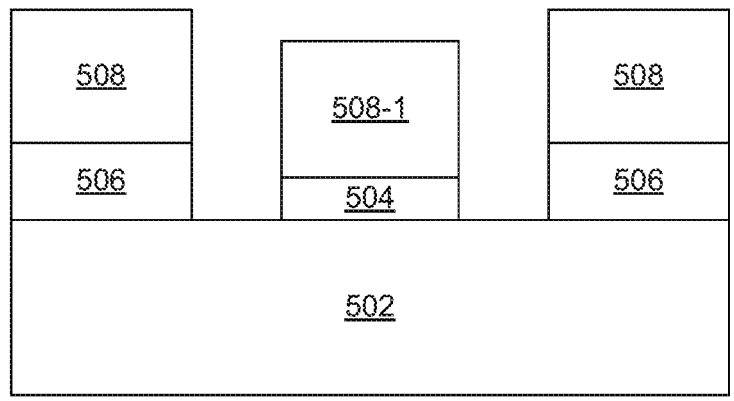

As depicted in FIG. 5C, a sidewall layer (508) forming another portion of the walls of the firing chamber (100) is deposited on the primer layer (506). In one example, the sidewall layer (508) may be made of the SU-8 material. In this example, the sidewall layer (508), like the primer layer (506), may be exposed to UV light in order to cross-link the SU-8 material of the sidewall layer (508) to form the structure depicted in FIG. 5C.

A plug layer (508-1) may be deposited before, during, or after the deposition of the sidewall layer (508). The plug layer (508-1) forms the free-floating plug (110). In one example, the plug layer (508-1) may be made of the SU-8 material used to form the sidewall layer (508) and may be deposited simultaneously or separately. In his example, the plug layer (508-1), like the sidewall layer (508) and the primer layer (506), may be exposed to UV light in order to cross-link the SU-8 material of the plug layer (508-1) to form the structure depicted in FIG. 5C.

Similar layers may be used to form the holding posts (112, 114). Fabrication of the holding posts (112, 114) is not depicted in FIGS. 5A through 5F because the holding posts (112, 114) are located in a different plane other than plan 120 that is relative to the center of the free-floating plug (110).

The thickness of the first sacrificial layer (504) is smaller than the primer layer (506) in order to form the plug (110) within the firing chamber (100) such that it is free-floating. As will be described in more detail below, when the cavity between the primer layers (506), sidewall layers (508), plug layer (508-1), and substrate (502) is filled and leveled with a second layer of sacrificial material deposited over the plug layer (508-1), the removal of the first and second sacrificial material (504, 510) will create the free-floating plug (110).

Figure 5D:
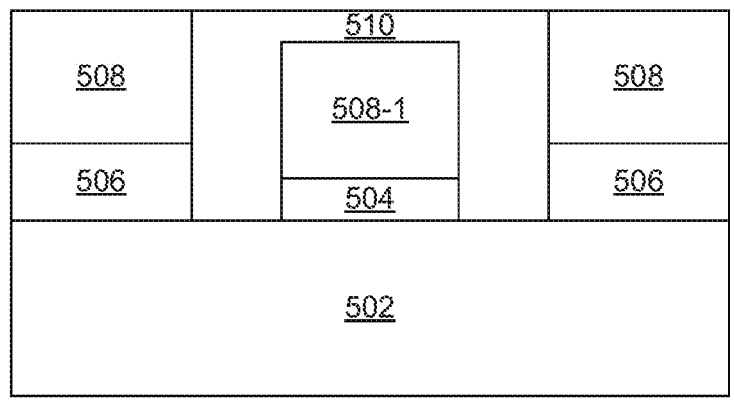
Figure 5E:
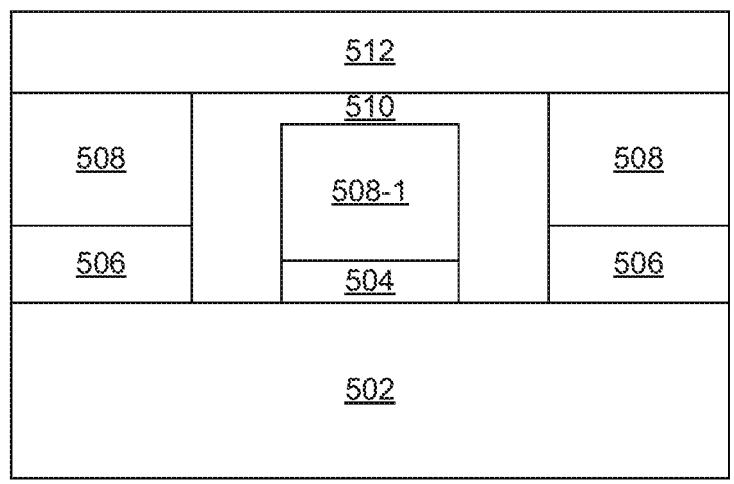

Turning to FIG. 5D, the second layer of sacrificial material (510) is deposited in the void formed by the primer layers (506) and sidewall layers (508) on the sides, the substrate (502) on the bottom, and the plug layer (508-1) in the middle as depicted in FIG. 5D. A top-hat membrane layer (512, FIG. 5E) is deposited across the entire firing chamber (100) as depicted in FIG. 5E. A space between the plug layer (508-1) and the top-hat membrane layer (512) allows for the creation of the plug (110) and prevents the plug (110) from attaching to or being formed with the top-hat membrane layer (512) as will be described in more detail below.

Turning to FIG. 5F, the first sacrificial material (504) and the second sacrificial material (510) are removed. In one example, the sacrificial layers are removed through a selective etching processes that will not damage the structural layers or elements including the primer layers (506) and sidewall layers (508) on the sides, the substrate (502) on the bottom, and the plug layer (508-1) in the middle.

The removal of the first sacrificial material (504) and the second sacrificial material (510) will create the free-floating plug (508-1') as depicted in FIG. 5F. In this manner, the plug (110 of FIG. 1, 508-1' of FIG. 5F) is formed as a free-floating, detached element within the firing chamber (100).

FIGS. 5H and 5G are a perspective (FIG. 5H) and top views (FIG. 5G), respectively, of a plug (508-1') that is disposed within the jettable material firing chamber of FIG. 1, according to one example of the principles described herein. As described above, the plug (508-1') may be formed with any quadratic shape including, for example, an ellipsoidal shape, spheroidal shape, a cone shape, a cylindrical shape, a torus shape, other closed three-dimensional shapes, or combinations thereof.

FIG. 6 is a block diagram of a fluid ejection device (600) including the jettable material firing chamber (100) of FIG. 1, according to one example of the principles described herein. The fluid ejection device (600) includes an electronic controller (602) and a fluid ejection assembly (604). The fluid ejection assembly (604) may include a jettable material firing chamber (100). The firing chamber (100) may be any example a firing chamber described, illustrated and/or contemplated by the present disclosure. The firing chamber (100) may include the check valve describe herein including the free-floating plug (508-1') as depicted in FIG. 5F, and holding posts (112, 114).

The electronic controller (602) may include a processor, firmware, and other electronics for communicating with and controlling the fluid ejection assembly (604) in order to eject fluid droplets in a precise manner. The electronic controller 602 receives data from a host system, such as a computer. The data represents, for example, a document and/or file to be printed and forms a print job that includes one or more print job commands and/or command parameters. From the data, the electronic controller (602) defines a pattern of drops to eject which form characters, symbols, and/or other graphics or images.

In one example, the fluid ejection device (600) may be an inkjet printing device. In this example, the fluid ejection device (600) may further include a fluidically-coupled jettable material reservoir (606) fluidically-coupled to the jettable material firing chamber (100) of the fluid ejection assembly (604) to supply jettable material thereto. FIG. 7 is a block diagram of a fluid ejection assembly of FIG. 6 incorporating a fluid plenum, according to one example of the principles described herein. In this example, the fluid plenum (702) may be coupled to the jettable material reservoir (606) and is a reservoir for ink to be supplied to at least a set of firing chambers (100) and, in some examples, to all of the firing chambers (100) of a fluid ejection assembly (604).

A media transport assembly (608) may be included in the fluid ejection device (600) to provide media for the fluid ejection device (600) in order to create images on the media via ejection of the jettable material from the firing chamber (100). The fluid ejection device (600) may further include a power supply (610) to power the various electronic elements of the fluid ejection device (600). In this example, pressure within an the fluid plenum (702) fluidically coupled between the firing chamber (100) and the fluidically-coupled jettable material reservoir (FIG. 6, 606) resists variance during a jettable material firing event and may be used to refill the firing chambers (100) within a fluid ejection assembly (604). Thus, with the use of a fluid plenum (702), the pressure difference between the firing chamber (100) and the fluid plenum (702) causes the plug (110) to move.

Figure 8:
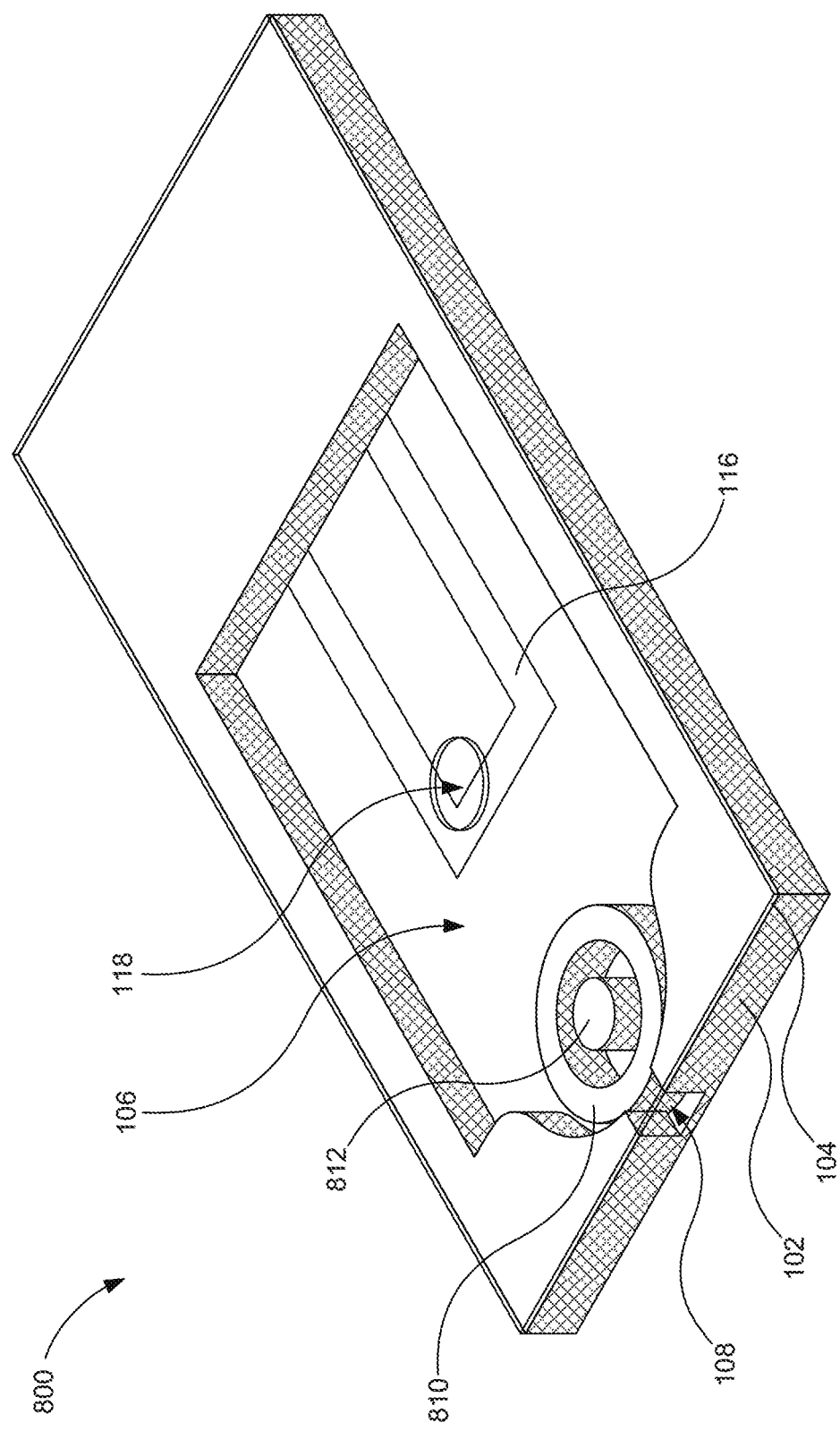
FIG. 8 is a perspective view of a jettable material firing chamber, according to another example of the principles described herein.

FIG. 8 is a perspective view of a jettable material firing chamber (800), according to another example of the principles described herein. The jettable material firing chamber (800) is similar to the embodiment of FIG. 1 and reference numerals used in FIG. 8 that are common to FIG. 1 are described herein in connection with FIG. 1. FIG. 8, however, includes a single holding post (812) and a free-floating, torus-shaped plug (810). The single holding post (812) is located within the void defined within the torus-shaped plug (810), and allows the torus-shaped plug (810) to move only as far as an inner diameter of the torus-shaped plug (810) permits. In one example, the torus-shaped plug (810) includes a square cross section. However, the torus-shaped plug (810) may have any cross section including elliptical, circular, triangular, or rectangular, among other cross-sectional shapes.

The torus-shaped plug (810) of FIG. 8 moves in a similar as described above in connection with FIGS. 1 through 3. During a firing event, the actuator (116) disposed within the firing chamber (800) create a relatively higher pressure within the firing chamber (800) compared to pressure within the firing chamber (800) before the firing event to force the torus-shaped plug (810) to block the inlet (108) and eject the jettable material from the nozzle aperture (118). After the jettable material firing event, the actuator (116) creates a lower pressure within the firing chamber (800) compared to pressure within the firing chamber (800) during the firing event. This lower, negative pressure forces the torus-shaped plug (810) to unblock the inlet (108) and refill the firing chamber (800) with jettable material via the inlet (108). Before the jettable material firing event, the position of the torus-shaped plug (810) within the firing chamber (800) is overcome by capillary forces to allow the jettable fluid to enter the firing chamber (800).

Figure 9:
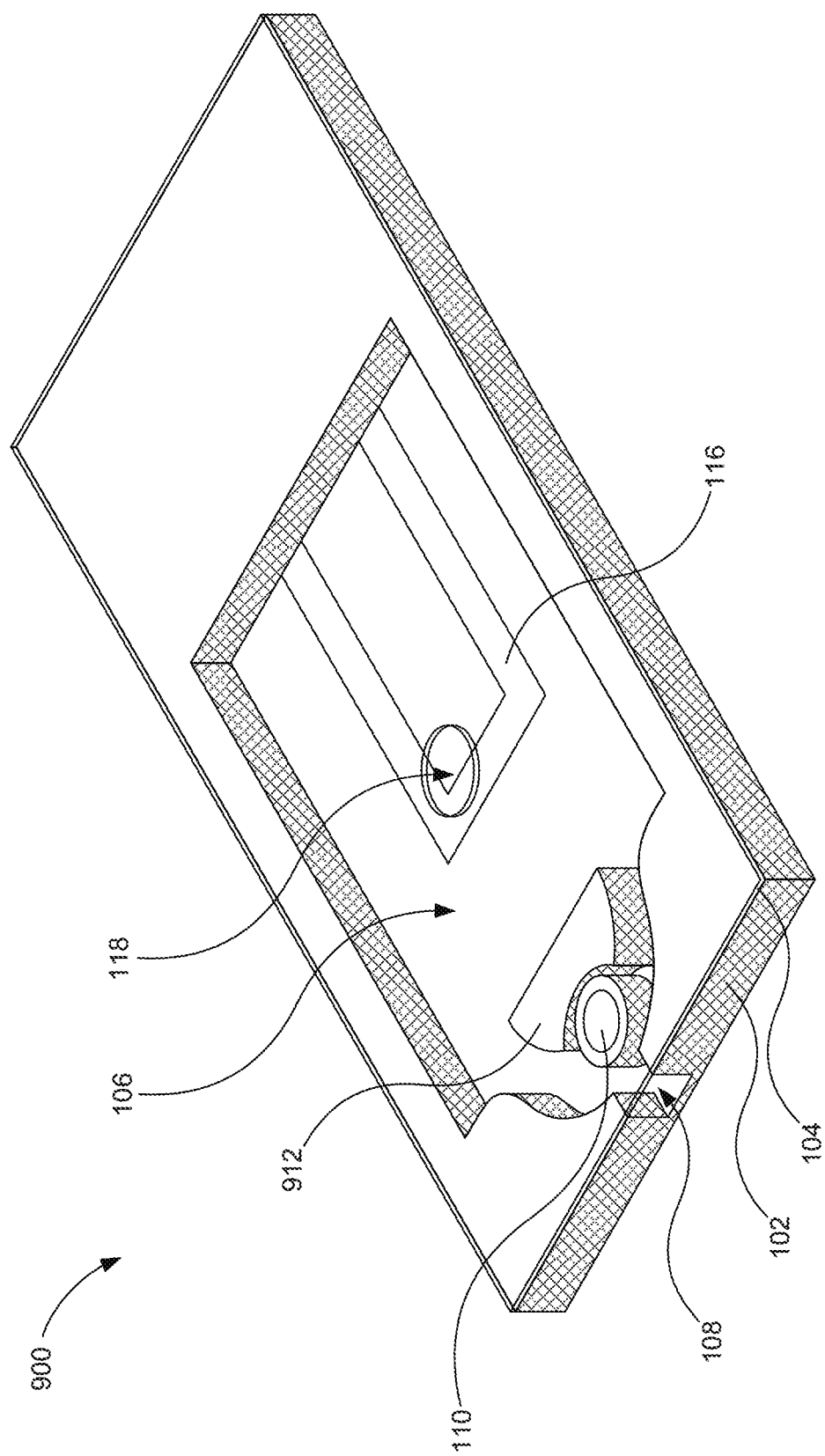
FIG. 9 is a perspective view of a jettable material firing chamber, according to yet another example of the principles described herein.

FIG. 9 is a perspective view of a jettable material firing chamber (900), according to yet another example of the principles described herein. The jettable material firing chamber (900) is similar to the embodiment of FIG. 1 and reference numerals used in FIG. 9 that are common to FIG. 1 are described herein in connection with FIG. 1. FIG. 9, however, includes a single holding post (912) and a free-floating plug (110). The single holding post (912) allows the free-floating plug (110) to freely move between the portion of the chamber recess (106) at which the inlet (108) is defined in the first layer (102) and the holding post (912). The holding post (912) of the example of FIG. 9 is similar to the holding posts (112, 114) of the example of FIG. 1 in that the holding post (912) functions in a similar manner.

However, the single holding post (912) of FIG. 9 is a singular combination of the holding posts (112, 114) of the example of FIG. 1. Thus, jettable fluid flows within the firing chamber (900) in a similar manner except with respect to flows between the holding posts (112, 114) wherein the example of FIG. 9 does not include this void.

Thus, plug (910) of FIG. 9 moves in a similar as described above in connection with FIGS. 1 through 3. During a firing event, the actuator (116) disposed within the firing chamber (900) create a relatively higher pressure within the firing chamber (900) compared to pressure within the firing chamber (900) before the firing event to force the plug (910) to block the inlet (108) and eject the jettable material from the nozzle aperture (118). After the jettable material firing event, the actuator (116) creates a lower pressure within the firing chamber (900) compared to pressure within the firing chamber (900) during the firing event. This lower, negative pressure forces the plug (910) to unblock the inlet (108) and refill the firing chamber (900) with jettable material via the inlet (108). Before the jettable material firing event, the position of the plug (910) within the firing chamber (900) is overcome by capillary forces to allow the jettable fluid to enter the firing chamber (900).

In one example, to increase the net force exerted on the plug (910) during the firing event, holding post (912) may have a shorter profile than the free-floating plug (110). In this example, the holding post (912) of FIG. 9 may include a shorter profile. This shorter profile uses less material and time in manufacturing the firing chamber (900). In this example, the height of the holding post (912) may be at least as high as the difference between the height of the free-floating plug (110) and any space between the top of the free-floating plug (110) and either the first layer (102) or second layer (104). These dimensions of the holding post (912) makes it impossible for the free-floating plug (110) to move over the holding post (912) and into other portions of the firing chamber (900).

Figure 10:
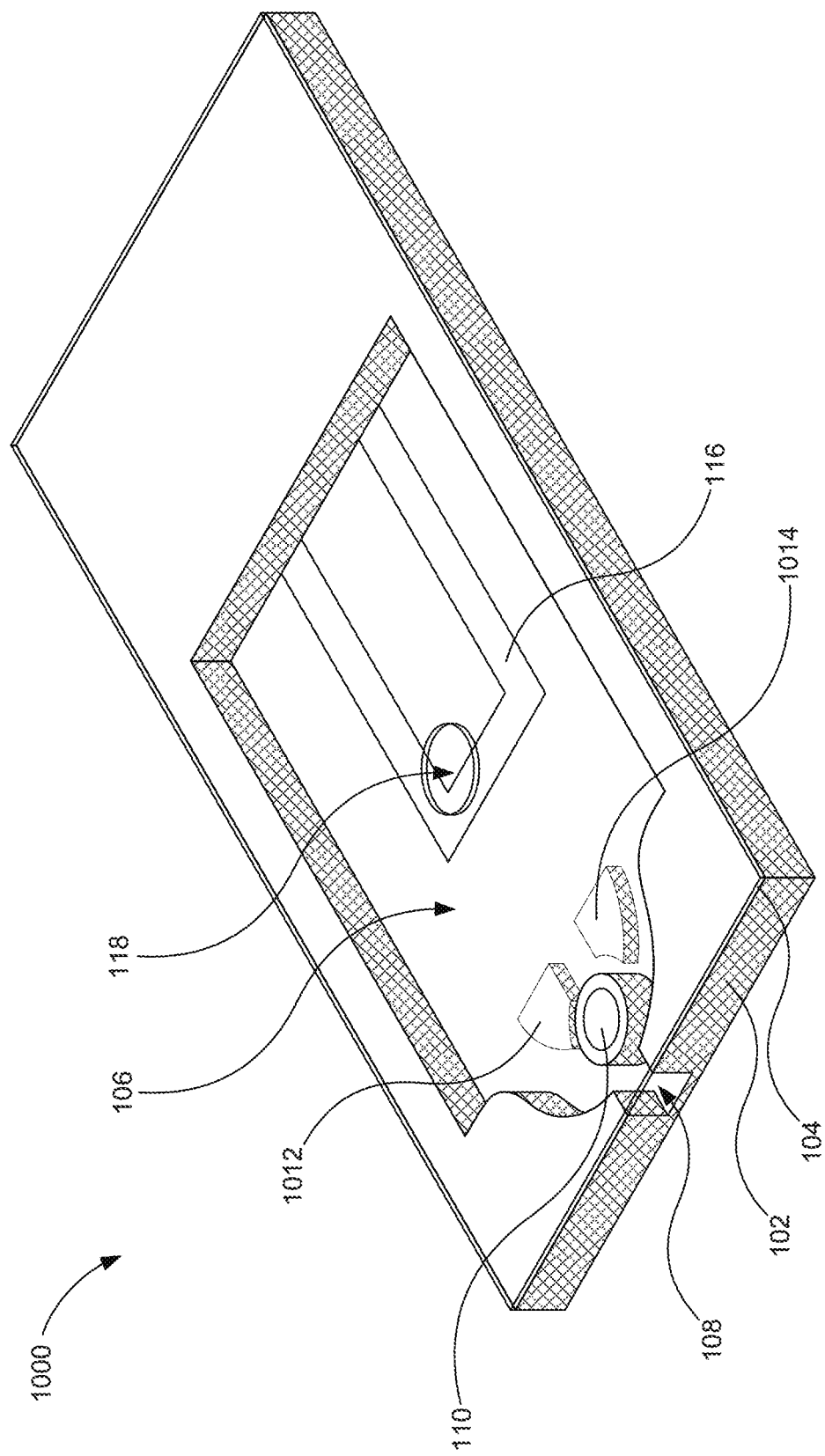
FIG. 10 is a perspective view of a jettable material firing chamber, according to still another example of the principles described herein.

FIG. 10 is a perspective view of a jettable material firing chamber (1000), according to still another example of the principles described herein. The jettable material firing chamber (1000) is similar to the embodiment of FIG. 1 and reference numerals used in FIG. 10 that are common to FIG. 1 are described herein in connection with FIG. 1, FIG. 10, however, includes holding posts (1012, 1014) similar to the holding posts (112, 114) described above in connection with FIG. 1. However, the holding posts (1012, 1014) of FIG. 10 include a shorter profile. This shorter profile uses less material and time in manufacturing the firing chamber (1000). In this example, the height of the holding posts (1012, 1014) may be at least as high as the difference between the height of the free-floating plug (110) and any space between the top of the free-floating plug (110) and either the first layer (102) or second layer (104). These dimensions of the holding posts (1012, 1014) make it impossible for the free-floating plug (110) to move over the holding posts (1012, 1014) and into other portions of the firing chamber (1000).

The firing chamber (1000) of FIG. 10 operates in a similar manner as described above in connection with FIGS. 1 through 3, except that fluid within the firing chamber (1000) is able to move more rapidly across the relatively lower profiles of the holding posts (1012, 1014) as compared to the holding posts (112, 114) described above in connection with FIG. 1.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the electronic controller (602) of the fluid ejection device (600) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a check valve for preventing reverse flow of jettable material within a jettable material firing chamber during a firing event. The check valve includes a free-floating plug. The check valve further includes at least one holding post, wherein the free-floating plug is arranged between at least one wall of the firing chamber and the holding post(s), the at least one wall and the holding post(s) restricting the movement of the free-floating plug within the chamber. Any number of holding posts may be included within the firing chamber including one or more holding posts. This check valve may have a number of advantages, including: (1) providing a larger volume of jettable material to be jetted out of the nozzle aperture for a given chamber size and thermal budget, without significantly effecting the refill speed; (2) by using a free-floating plug, the amount of backflow in in firing chamber may be effectively reduced without compromising the printing firing speed, die real-estate, or fabrication simplicity; and (3) reduction or elimination of cross-talk between adjacent firing chambers within a fluid ejection assembly.

The preceding description has been presented to illustrate and describe examples of the principles described. This description is not intended to be exhaustive or to limit these principles to any precise form disclosed. Many modifications and variations are possible in light of the above teaching.

What is claimed is:

1. A check valve for preventing reverse flow of jettable material within a jettable material firing chamber during a firing event, comprising:
   a free-floating plug; and
   a first holding post and a second holding post spaced apart from the first holding post, wherein the first and second holding posts extend from a bottom floor of the firing chamber, and each of the first and second holding posts has a first height, and wherein the free-floating plug has a second height greater than the first height, each of the first height and the second height being along a direction of a thickness of the firing chamber extending from the bottom floor,
   wherein the free-floating plug is arranged between the first and second holding posts and an inlet in a wall of the firing chamber, the wall and the first and second holding posts restricting a movement of the free-floating plug within the firing chamber when the free-floating plug physically contacts the first and second holding posts, wherein the free-floating plug is spaced away from the inlet when the jettable material flows from a jettable material reservoir through the inlet and past the free-floating plug into the firing chamber, and wherein the free-floating plug is forced against the inlet responsive to a pressure generated by the firing event in the firing chamber to stop a backflow of the jettable material in the firing chamber through the inlet to a fluid passage between the inlet and the jettable material reservoir, wherein, during the firing event, a firing device disposed within the firing chamber is to create a relatively higher pressure within the firing chamber compared to a pressure within the firing chamber before the firing event to move the free-floating plug against the inlet to block the inlet and eject the jettable material from a nozzle aperture.

2. The check valve of claim 1, wherein the free-floating plug is disposed within the firing chamber upstream from a number of jettable material firing devices disposed within the firing chamber and downstream from the inlet through which the jettable material enters the firing chamber.

3. The check valve of claim 1, wherein, after the firing event, the free-floating plug is moved away from the inlet to unblock the inlet and refill the firing chamber with further jettable material via the inlet, responsive to a lower pressure within the firing chamber compared to a pressure within the firing chamber during the firing event.

4. The check valve of claim 1, wherein, before the firing event, a position of the free-floating plug within the firing chamber is overcome by capillary forces to allow the jettable material to enter the firing chamber.

5. A jettable material firing chamber apparatus, comprising:
a sidewall defining a chamber recess;
an actuator in the chamber recess, the actuator when activated to eject a jettable material from the chamber recess through an aperture;
an inlet in the sidewall;
a free-floating plug; and
a first holding post and a second holding post spaced apart from the first holding post, wherein the first and second holding posts extend from a bottom floor of the chamber recess, and each of the first and second holding posts has a first height, and wherein the free-floating plug has a second height greater than the first height, each of the first height and the second height being along a direction of a thickness of the chamber recess extending from the bottom floor,
wherein the free-floating plug is arranged between the first and second holding posts and the inlet in the sidewall, the sidewall and the first and second holding posts restricting a movement of the free-floating plug within the chamber recess when the free-floating plug physically contacts the first and second holding posts, wherein the free-floating plug is spaced away from the inlet when the jettable material flows from a jettable material reservoir through the inlet and past the free-floating plug into the chamber recess, and wherein the free-floating plug is forced against the inlet responsive to a pressure generated by a firing of the actuator in the chamber recess to stop a backflow of the jettable material in the chamber recess through the inlet to a fluid passage between the inlet and the jettable material reservoir.

6. The jettable material firing chamber apparatus of claim 5, wherein the free-floating plug is disposed upstream from a number of actuators disposed within the chamber recess and downstream from the inlet through which the jettable material enters the chamber recess.

7. The jettable material firing chamber apparatus of claim 5, wherein a position of the free-floating plug between the sidewall and the first and second holding posts is dependent on a firing of the actuator.

8. The check valve of claim 1, wherein the free-floating plug is moved away from the inlet after the firing event responsive to a lower pressure in the firing chamber caused by lack of the jettable material in the firing chamber, and wherein the free-floating plug when moved away from the inlet after the firing event causes suction of further jettable material into the firing chamber from the jettable material reservoir through the fluid passage.

9. The check valve of claim 1, wherein the free-floating plug has a cylindrical shape, and the second height is along a longitudinal axis of the cylindrical shape of the free-floating plug, and each of the first and second holding posts extends along the first height in a direction parallel to the longitudinal axis.

10. The jettable material firing chamber apparatus of claim 5, wherein the sidewall is formed of a same material as the free-floating plug.

11. The jettable material firing chamber apparatus of claim 10, wherein the same material comprises SU-8.

12. The jettable material firing chamber apparatus of claim 10, wherein each of the first and second holding posts is formed of the same material.

13. The jettable material firing chamber apparatus of claim 5, wherein the free-floating plug is moved away from the inlet after the firing of the actuator responsive to a lower pressure in the chamber recess caused by lack of the jettable material in the chamber recess, and wherein the free-floating plug when moved away from the inlet after the firing of the actuator causes suction of further jettable material into the chamber recess from the jettable material reservoir through the fluid passage.

14. The jettable material firing chamber apparatus of claim 5, wherein the free-floating plug has a cylindrical shape, and the second height is along a longitudinal axis of the cylindrical shape of the free-floating plug, and each of the first and second holding posts extends along the first height in a direction parallel to the longitudinal axis.

* * * * *